United States Patent [19]

Moy

[11] Patent Number: 5,464,287

[45] Date of Patent: Nov. 7, 1995

[54] BEARING FOR HATCH COVERS OR THE LIKE

[75] Inventor: James Moy, Norwell, Mass.

[73] Assignee: Quamco, Inc., Rockland, Mass.

[21] Appl. No.: 272,683

[22] Filed: Jul. 8, 1994

Related U.S. Application Data

[63] Continuation-in-part of Ser. No. 10,611, Jan. 28, 1993, Pat. No. 5,330,271.

[51] Int. Cl.⁶ ........................................... F16C 29/02
[52] U.S. Cl. ..................... 384/13; 384/42; 114/201 R
[58] Field of Search .................... 384/13, 36, 42, 384/41, 26, 911; 114/201 R, 202; 277/180, 230

[56] References Cited

U.S. PATENT DOCUMENTS

| | | |
|---|---|---|
| 3,924,907 | 12/1975 | Czernick et al. . |
| 4,238,137 | 12/1980 | Furchak et al. . |
| 4,846,089 | 7/1989 | Cedergreen . |
| 5,215,314 | 6/1993 | Nakaya . |

FOREIGN PATENT DOCUMENTS

| | | |
|---|---|---|
| 0202897 | 11/1986 | European Pat. Off. . |
| 3919833 | 12/1990 | Germany . |
| 4206756 | 9/1993 | Germany . |
| 6404559 | 11/1964 | Netherlands . |

OTHER PUBLICATIONS

Die Bautechnik, vol. 39, No. 2, Feb. 1962, Berlin, pp. 37–50.

*Primary Examiner*—Lenard A. Footland
*Attorney, Agent, or Firm*—Chilton, Alix & Van Kirk

[57] ABSTRACT

A self-lubricating bearing suitable for marine applications, such as supporting hatch covers, has a bearing surface defined by a flexible woven pad. This woven pad is draped over a pillow plate and captured in position. To ensure that there will be a low friction interface between the pillow plate and the load supported on the bearing if the woven pad is severely damaged or lost, the pillow plate is designed to present a surface having a coefficient of friction lower than a metal-to-metal interface to the load.

20 Claims, 2 Drawing Sheets

5,464,287

BEARING FOR HATCH COVERS OR THE LIKE

CROSS REFERENCE TO RELATED APPLICATIONS

This application is a continuation-in-part of application Ser. No. 010,611 filed Jan. 28, 1993, now U.S. Pat. No. 5,330,271.

BACKGROUND OF THE INVENTION

1. Field of the Invention

The present invention relates to enhancements in providing support for very large and heavy loads while simultaneously permitting limited movement of such loads in response to applied forces, particularly forces which are exerted in directions which vary. More specifically, this invention is directed to improvements in bearing devices which are suitable for use in a marine environment, and especially to replaceable, slide bearings which are particularly well suited for use in the support of hatch covers. Accordingly, the general objects of the present invention are to provide novel and improved methods and apparatus of such character.

2. Description of the Prior Art

While not limited thereto in its utility, the present invention is particularly well suited for use as a bearing on which a hatch cover of a sea-going vessel may be supported. The problems precipitated by the very demanding use environment of a hatch cover bearing for cargo carrying vessels is discussed in the above-referenced co-pending application, the co-pending application being incorporated herein by reference. Co-pending application Ser. No. 010,611, now U.S. Pat. No. 5,330,271 also discloses a novel and successful approach to solving these problems.

As is the case with most pioneer inventions, some of the operating conditions may on occasion prove to be so exceptionally harsh that modifications to the basic invention are required. By way of example, in the case of the bearing device of application Ser. No. 010,611, the self-lubricating pad which actually contacts the hatch cover could, in theory, be rendered ineffective through damage or actually be "lost". In the unlikely event of such catastrophic damage or loss, the bearing device would be reduced to affording the undesirable metal-on-metal contact of the prior art hatch cover support pads. Thus, a means for rendering the bearing device of the co-pending application "fail-safe" would constitute an improvement.

As yet another theoretical problem with the bearing device of the co-pending application, the pillow plate on which the self-lubricating pad is supported is affixed to the sub-base plate by means of peripheral fillet welds. Such fillet welding of the ends and sides of the pillow plate to the sub-base plate may not provide a mechanical connection of sufficient strength to absolutely ensure that separation of components cannot occur under exceptionally high loading.

SUMMARY OF THE INVENTION

The present invention overcomes the above-briefly discussed and other theoretical or potential deficiencies and disadvantages of the bearing of the parent application and, in so doing, provides an improved replaceable bearing structure which is particularly well suited for use in supporting a hatch cover. A bearing structure in accordance with the present invention is characterized by enhanced mechanical integrity when compared to that of the parent application and/or by a back-up low friction support surface which will contact the load should there be a catastrophic failure of the primary bearing element. These desirable characteristics are achieved while maintaining the attributes of ease of installation and replacement, self-maintenance, relatively long service life expectancy, assembly entirely from components which are corrosion resistant, the capability of absorbing and supporting very large loads and the ability to elastically accommodate irregularities in contact surfaces.

A bearing in accordance with the present invention comprises a base plate and a pillow plate, both of which will typically be of generally rectangular shape. An engineered self-lubricating pad is draped over the pillow plate and mechanically captured in place. Under normal operating conditions, the exposed surface of the self-lubricating pad contacts the load.

In accordance with a first embodiment of the invention, in order to ensure some lubricity between the upper surface of the pillow plate and the load should the self-lubricating pad be torn away from its capture means, the pillow plate is designed to function as a fail-safe back-up bearing surface. This back-up bearing surface will produce a friction level which is lower than an untreated metal against metal interface. In order to function as an interface having a relatively low coefficient of friction, in accordance with one implementation, a coating of a suitable material, polytetraflorethylene (PTFE) for example, may be provided on a pillow plate which is comprised of an appropriate metal as dictated by the use environment. In accordance with a second implementation, the pillow plate may itself be porous and be impregnated with the self-lubricating material. In yet another implementation, the pillow plate may be provided with "retention cavities" which extend inwardly from its upper surface and these retention cavities will be filled with the self-lubricating material. In accordance with a further implementation, the pillow plate itself may be fabricated from a self-lubricating non-metallic material, and specifically a fiber composite.

In accordance with a second embodiment of the present invention, the pillow plate is provided with an elongated, centrally disposed slot. This slot affords increased area for welding the pillow plate onto the underlying structure of the bearing device. Additionally, it has been found that it is easier to weld through the slot than to join the pillow plate to the underlying structure through the use of peripheral fillet welds. The elongated slot will be filled after welding. If the slot is filled with metal, the upper surface of the pillow plate will be subsequently ground to re-establish a planar surface for supporting the self-lubricating pad. The slot may also be filled with a self-lubricating material to provide the back-up bearing surface as discussed above.

BRIEF DESCRIPTION OF THE DRAWING

The present invention may be better understood and its numerous objects and advantages will become apparent to those skilled in the art by reference to the accompanying drawing wherein like reference numerals refer to like elements in the several figures and in which.

DESCRIPTION OF THE DISCLOSED EMBODIMENTS

Figure 1:
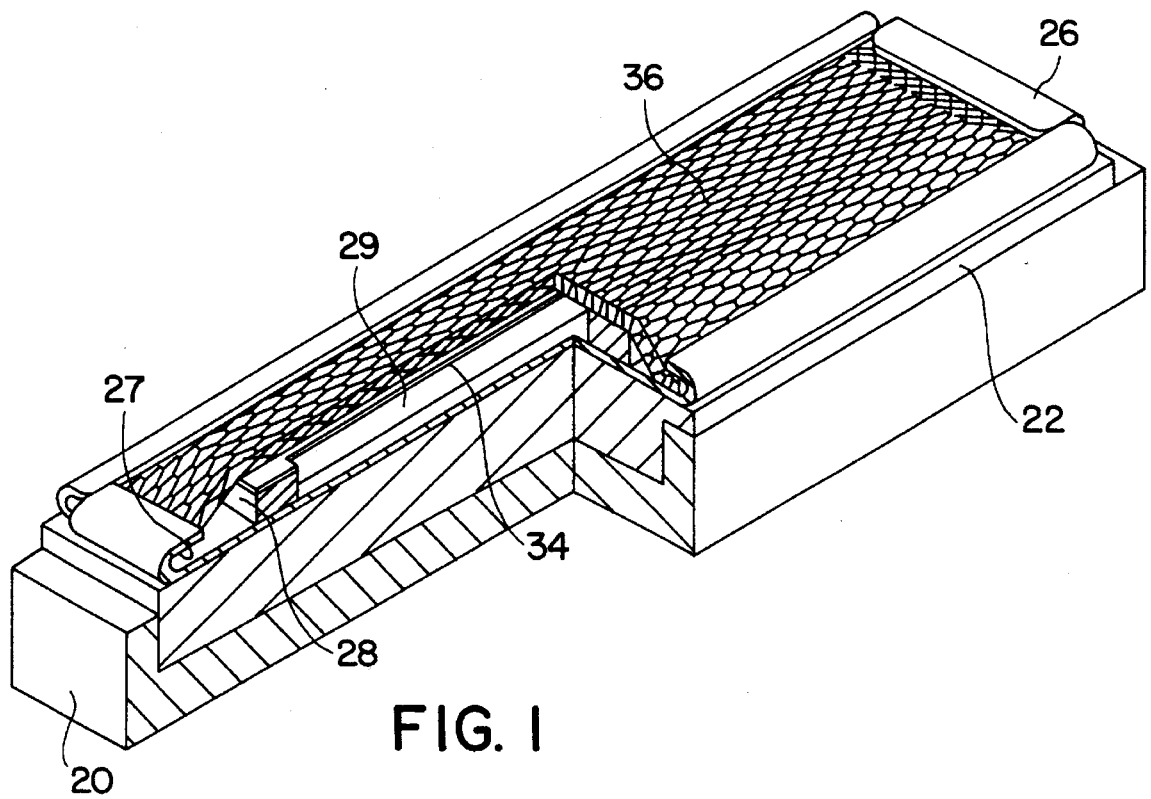
FIG. 1 is a perspective view, partly in cut-away to show detail, of a hatch cover bearing in accordance with a first embodiment of the present invention, the bearing being shown mounted on a support bed and elements of the bearing having been eliminated from FIG. 1 in the interest of facilitating understanding of the invention.
Figure 2:
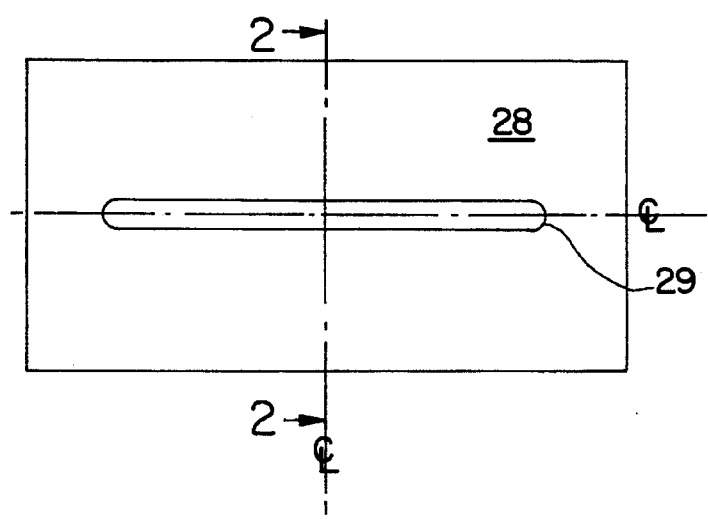
FIG. 2 is a top view of the pillow plate of the embodiment of FIG. 1.
Figure 3:
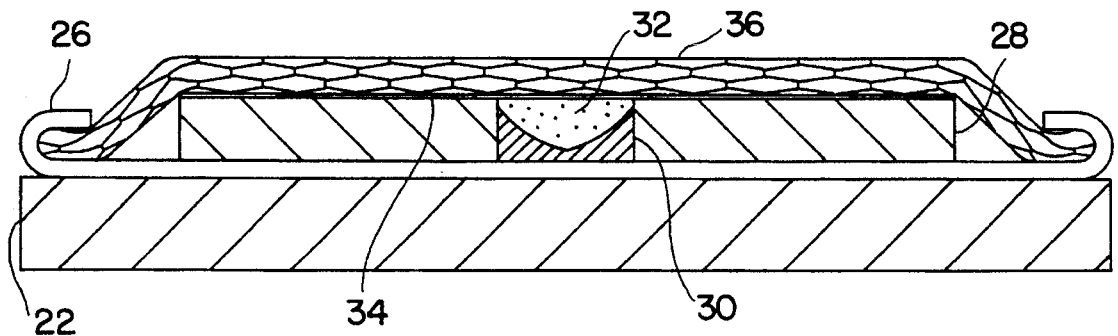
FIG. 3 is a cross-sectional, side-elevation view of a bearing in accordance with the embodiment of FIG. 1 taken along center line 2—2 of the pillow plate.

Referring to FIGS. 1–3, a first embodiment of a lubricated hatch cover bearing in accordance with the present invention which can be mounted on top of a hatch cover support pad is shown. The bearing structure of FIGS. 1–3 is shown mounted on top of a bed 20 which does not comprise part of the invention. The bearing device comprises a base plate 22. The cross-sectional shape of base plate 22 is dictated by the underlying structure, such as bed 20, and does not constitute a feature of the invention. In the disclosed embodiments of the invention, a sub-base plate 26 is welded to base plate 22. Sub-base plate 26 is typically comprised of stainless steel and is fabricated from a guage metal which permits the four edge portions thereof to be folded back on themselves to provide two pairs of facing capture slots such as slot 27 (FIG. 1).

A pillow plate 28 is affixed to the sub-base plate 26. Pillow-plate 28 is, in the embodiment being described, also typically comprised of stainless steel and is smaller in both the length and width dimensions when compared to the sub-base plate 26. In accordance with the embodiment of FIGS. 1–3, pillow plate 28 is provided with a centrally located, elongated slot 29. The primary means of attachment of pillow plate 28 to the sub-base plate 26 will be by welding through the slot 29. The weld, indicated at 30 in FIG. 3, has not been shown in FIG. 1 in the interest of facilitating understanding of the invention. Also in accordance with the embodiment of the invention being described, after the weld 30 has been formed, the slot 29 may be filled with a suitable metal as indicated at 32. Alternatively, the slot may be filled with a material such as PTFE. After the slot 29 has been filled, the upper surface of pillow plate 28 is subjected to a grinding operation to ensure that it is planar.

It should be noted that, in addition to the weld 30 formed through the slot 29, the pillow plate 28 may be joined to the sub-base plate 26 by fillet welds which extend partly or completely about the periphery of the pillow plate as shown in parent application Ser. No. 010,611.

In accordance with the embodiment of FIGS. 1–3, the exposed or upper surface of pillow plate 28 is provided with a lubricating coating in the form of a layer 34 of a self-lubricating material such as PTFE. The deposition of the layer 34 of PTFE may, for example, be accomplished by means of spray coating.

A woven lubricant pad 36 is provided over pillow plate 28. Pad 36 is larger than plate 28, has a limited amount of elasticity and is flexible. Accordingly, the edge portions of pad 36 drape over the four edges of pillow plate 28. In accordance with the preferred embodiment, pad 36 is woven from multifiliment threads comprised of a self-lubricating material such as PTFE to provide an oriented fibrous weave.

Pad 36 may also be comprised of multiple types of fibers such as, for example, PTFE and aramid.

The bearing of FIGS. 1–3 is assembled by welding plates 22, 26 and 28 together as described above. Next, the pad 36 is positioned over pillow plate 28 and the pad mechanically captured in position. In the disclosed embodiment the mechanical capture is accomplished by folding the edge regions of sub-base plate 26 back on themselves to define overlaps or flaps as may be seen in FIG. 1. Each of these flaps defines a capture slot 27 for one of the four edges of pad 36. The inwardly disposed ends of the flaps formed by the folded edges of sub-plate 26 cooperate with facing sides of the pillow plate 28 to define gaps through which the pad 36 passes and in which the pad is pinched. The radius of the bends formed when sub-plate 26 is folded result in the outwardly facing exposed portions of plate 26 being lower than the upper surface of pillow plate 28. As will be recognized by those skilled in the art, there are techniques other than the above-described crimping process by which the pad 36 may be mechanically fastened to the remainder of the bearing structure.

When the bearing is in use, the woven pad 36, due to its elasticity, will absorb impacts when the hatch cover is installed and will also accommodate dimensional irregularities such as a lack of parallism between a contact surface on the hatch cover and the top of a support pad. Because of its self-lubricating characteristic, and its resistance to wear, the pad 36 will function as an efficient bearing surface over a long period of time under normal operating conditions. However, should the pad 36 become severely damaged or detached from the bearing, the layer 34 of self-lubricating material will form a back-up, relatively low friction interface with the hatch cover, and this low friction back-up or fail-safe feature will prevent irreparable damage until such time as the bearing can be replaced or repaired by installation of a new pad 36. The provision of the layer 34 of PTFE or the like, accordingly, incorporates a fail-safe feature into the bearing.

Figure 4:
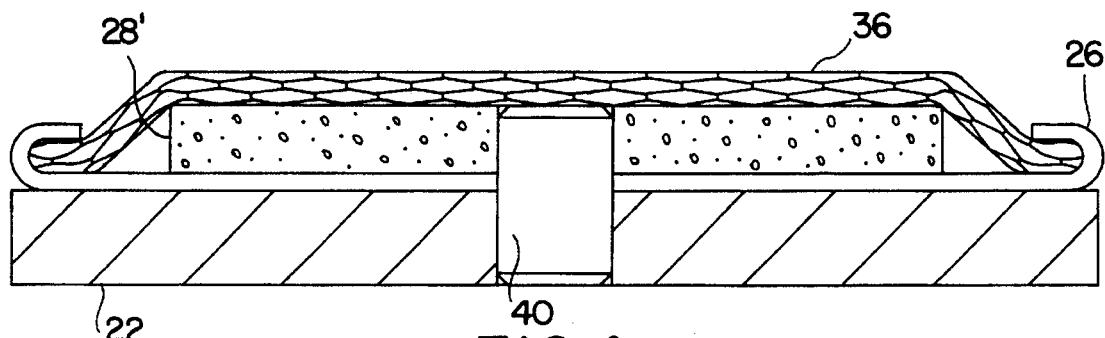
FIG. 4 is a view similar to FIG. 3 depicting a second embodiment of the invention.

Referring to FIG. 4, a second embodiment of the present invention is shown. In the FIG. 4 embodiment, the pillow plate 28' is fabricated using powder metal technology and is thus porous. This porous plate is impregnated with a self-lubricating material such as PTFE. In accordance with the FIG. 4 construction, rather than having a separate layer 34 of lubricating material formed over the surface of pillow plate 28, the plate itself defines a surface which is randomly or sporadically comprised of the self-lubricating material. The plate 28' may be attached to the sub-base plate 26 by pins, such as indicated at 40, which are press fit into aligned holes in plates 22, 26 and 28.

Figure 5:
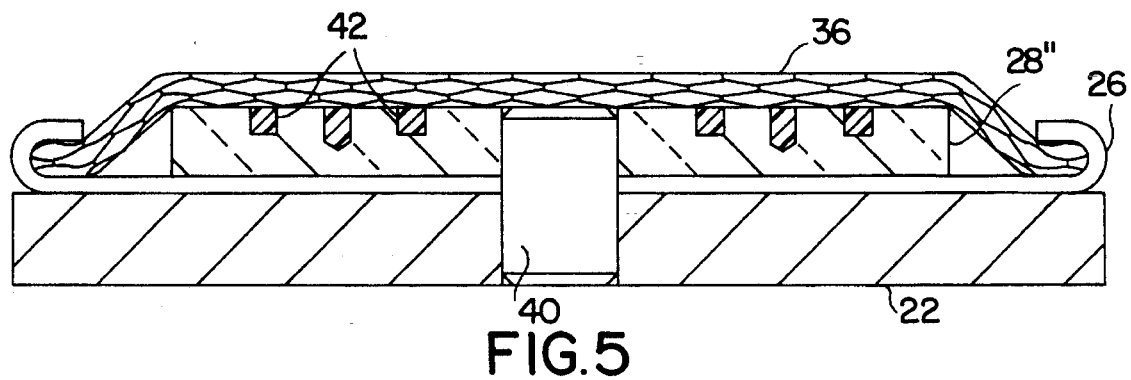
FIG. 5 is a further view, similar to FIG. 3, depicting a third embodiment of the invention.

In the FIG. 5 embodiment, the upper surface of the pillow plate 28" is provided with a plurality of retention cavities. These retention cavities are filled with self-lubricating material as indicated at 42. Should the upper surface of the pillow plate 28" be required to function as a bearing surface, the blocks 42 of self-lubricating material will reduce the coefficient of friction both by their actual presence and by the fact that the material in the retention cavities will "smear" over the surface of the pillow plate 28" in response to any relative movement between the pillow plate and the abutting load. It is to be noted that, as discussed above, the slot 29 of the embodiment of FIGS. 1–3 may also function as a retention cavity for self-lubricating material, i.e., rather than fill slot 29 with metal above the fusion bond zone, the slot 29 may be filled with a self-lubricating material.

Figure 6:
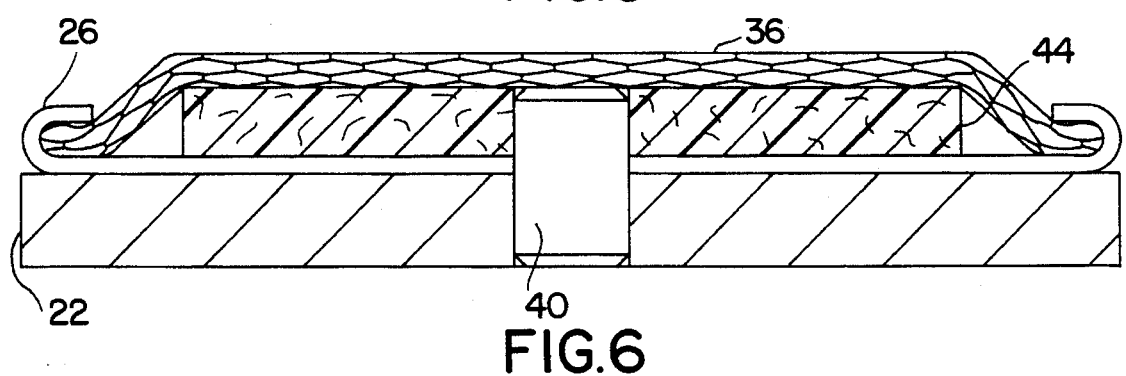
FIG. 6 is an additional view, similar to FIG. 3, depicting a fourth embodiment of the invention.

In accordance with yet another embodiment of the invention, the metal pillow plate 28, 28' or 28" can be replaced by a plate comprised of a self-lubricating non-metallic material. Such a plate has been indicated at 44 in FIG. 6 and may be a fiber composite. Such a fiber composite plate may, for example, consist of a polymeric matrix, PTFE or a phenolic for example, and a fiber comprised of a material such as an aramid or PTFE. The fiber composite pillow plate 44 will be mechanically fastened to the sub-base plate. Such mechanical fastening may, for example, be accomplished in the manner discussed above in the description of the FIG. 4 embodiment. Thus, shear pins 40, which are press fit into aligned holes provided in the composite pillow plate 44 and the sub-base plate 26 may provide the mechanical coupling.

While preferred embodiments have been shown and described, various modifications and substitutions may be made thereto without departing from the spirit and scope of the invention. Accordingly, the present invention has been described by way of illustration and not limitation.

What is claimed is:

1. A bearing assembly comprising:
   base means for supporting a bearing element, said base means being adapted to be secured to a support element;
   plate means for defining a bearing surface area, said plate means being positioned in registration with said base means;
   flexible, self-lubricating bearing means disposed over said plate means, said bearing means being a woven member comprised of at least a first fiber, said woven member conforming generally to the form of said plate means and extending beyond the edges thereof;
   capture means for retaining said woven member on said plate means;
   means for maintaining the registration of said plate means with said base means; and
   means for reducing the coefficient of friction of the surface of said plate means which faces said woven member, said coefficient of friction reducing means being integral with said plate means.

2. The bearing assembly of claim 1 wherein said coefficient of friction reducing means comprises a coating on at least a part of the said woven member facing surface of said plate means.

3. The bearing assembly of claim 1 wherein said plate means is at least in part porous and wherein said coefficient of friction reducing means comprises a solid lubricating material disposed in pores of said plate means.

4. The apparatus of claim 3 wherein said means for maintaining registration of said plate and base means comprises at least a first pin received in aligned apertures in said plate and base means.

5. The bearing assembly of claim 1 wherein plate means is provided with plural cavities in said woven member facing surface and wherein said coefficient of friction reducing means comprises a solid lubricating material disposed in said cavities.

6. The bearing assembly of claim 1 wherein said plate means comprises a pillow plate and wherein said capture means is comprised of a sheet of deformable metal, said capture means sheet being sandwiched between said base means and said pillow plate, said capture means sheet being deformed to engage edge regions of said woven bearing member which extend beyond edges of said pillow plate.

7. The bearing assembly of claim 6 wherein said coefficient of friction reducing means comprises a coating on at least a part of the said woven member facing surface of said plate means.

8. The bearing assembly of claim 6 wherein said plate means is at least in part porous and wherein said coefficient of friction reducing means comprises a solid lubricating material disposed in pores of said plate means.

9. The apparatus of claim 8 wherein said means for maintaining registration of said plate and base means comprises at least a first pin received in aligned apertures in said pillow plate, capture means sheet and base means.

10. The bearing assembly of claim 6 wherein plate means is provided with plural cavities in said woven member facing surface and wherein said coefficient of friction reducing means comprises a solid lubricating material disposed in said cavities.

11. The apparatus of claim 10 wherein said means for maintaining registration of said plate and base means comprises at least a first pin received in aligned apertures in said pillow plate, capture means sheet and base means.

12. A bearing assembly comprising:
    base means for supporting a bearing member, said base means being adapted to be secured to a support element;
    plate means for defining a bearing surface area, said plate means being positioned in registration with said base means, said plate means being comprised of a fiber composite which includes a self-lubricating material;
    flexible, self-lubricating bearing means disposed over said plate means, said bearing means being a woven member comprised of at least a first fiber, said woven member conforming generally to the form of said plate means and extending beyond the edges thereof;
    capture means for retaining said woven member on said plate means; and
    means for maintaining the registration of said plate means with said base means.

13. The bearing assembly of claim 12 wherein said plate means comprises a pillow plate and wherein said capture means is comprised of a sheet of deformable metal, said capture means sheet being sandwiched between said base means and said pillow plate, said capture means sheet being deformed to engage edge regions of said woven bearing member which extend beyond edges of said pillow plate.

14. The bearing assembly of claim 13 wherein said means for maintaining the registration of said plate means and base means comprises at least a first pin received in aligned apertures in said pillow plate, said capture means sheet and said base means.

15. A bearing assembly comprising:
    base means for supporting a bearing element, said base means being adapted to be secured to a support element;
    plate means for defining a bearing surface area, said plate means being positioned in registration with said base means, said plate means being provided with a centrally disposed, elongated opening which extends therethrough between oppositely disposed first and second sides, a first of said plate means sides facing said base means;
    flexible, self-lubricating bearing means disposed over said plate means and in contact with said plate means second side, said bearing means being a woven member comprised of at least a first fiber, said woven member conforming generally to the form of said plate means and extending beyond the edges thereof;
    capture means for retaining said woven member on said plate means; and means for maintaining the registration of said plate means with said base means, said registration maintaining means at least in part cooperating with said opening in said plate means.

16. The bearing assembly of claim 15 wherein said plate means is comprised of metal and wherein said capture means is includes of a sheet of metal, said capture means sheet being sandwiched between said plate means and said base means, said registration maintaining means comprising a fusion bond which joins said plate means to said capture means in the region of said opening in said plate means.

17. The bearing assembly of claim 16 further comprising:
means for reducing the coefficient of friction of said second side of said plate means.

18. The bearing assembly of claim 17 wherein said coefficient of friction reducing means comprises a coating on at least a part of the said second side of said plate means.

19. The bearing assembly of claim 18 wherein said capture means sheet is deformed to engage edge regions of said woven member which extend beyond edges of said plate means.

20. The bearing assembly of claim 19 wherein said woven bearing member is a pad comprised of threads woven in accordance with a predetermined orientation and wherein said threads are comprised of twisted continuous filaments of a material having a low coefficient of friction.

* * * * *